Patented Oct. 28, 1952

2,615,850

UNITED STATES PATENT OFFICE 2,615,850

MANGANESE ACTIVATED ZINC LITHIUM SILICATE PHOSPHOR

Alfred H. McKeag, North Wembley, England, assignor to General Electric Company, a corporation of New York No Drawing. Application April 28, 1951, Serial No. 223,663. In Great Britain May 30, 1950

2 Claims. (Cl. 252—301.6)

This invention relates to luminescent materials, one of its objects being to provide luminescent materials which differ from previously known luminescent materials in their composition and which are suitable for use in fluorescent electric discharge lamps, or for cathode ray tube screens, or for X-ray screens, or for two or more of these purposes. The invention also relates to a method of manufacturing such luminescent materials and to combinations of such luminescent materials with electrical means for exciting them to luminescence, for example electric discharge lamps and cathode ray tubes.

According to the invention, a luminescent material capable of being excited to luminescence by ultraviolet radiation of wavelength 2537 A. consists of crystals containing the elements zinc, lithium, silicon, oxygen and manganese.

The luminescent materials of the invention may be regarded as consisting essentially of compounds formed by the combination of the oxides of zinc, lithium and silicon, that is to say, zinc lithium silicates, activated by manganese.

The compositions of the luminescent materials according to the invention may vary over a considerable range, the preferred molecular ratio of zinc oxide (ZnO) to lithium oxide ($Li_2O$), however, being two to one. The silica content may be as much as 12 molecules of $SiO_2$ to one molecule of lithium oxide but may be considerably less than this, for example it may be as low as two molecules of silica to one of lithia. An increase in the silica content tends to increase the pink component of the luminescence color. I have found that a material of the composition represented by the empirical formula

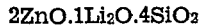

$2ZnO.1Li_2O.4SiO_2$ activated by manganese, has particularly useful luminescent properties.

The proportion of manganese employed as the activator in the luminescent materials of the invention may also vary over a wide range, an increase in the manganese content in general producing a shift in the color of the luminescence in the direction of longer wavelengths. A suitable proportion of manganese is, for example, about 2 to 5 per cent by weight of the material, but higher or lower proportions may be used.

Manganese-activated zinc lithium silicate luminescent materials are excited to luminescence by ultraviolet radiation of wavelength 2537 A., cathode rays and X-rays, the color of luminescence produced varying to some extent with the different exciting agencies.

The luminescent materials according to the invention may be produced by heating a mixture of compounds containing zinc, lithium, silicon, oxygen and manganese in the desired proportions. Suitable compounds for use as starting materials are, for example, the oxides or carbonates of zinc, lithium and manganese and silica in the form of silica gel. The mixture of powdered materials is milled to ensure thorough mixing and is heated for a period of from one to five hours at a suitable temperature, for example above 900° C. The heating is preferably carried out at 1000° C. to 1100° C. and it has been found that heating in steam, either in place of heating in air or as an additional step in the process of manufacture, is advantageous since it results in improved brightness of the luminescence of the product.

It is to be understood that the materials used in the manufacture of the luminescent materials of the invention must be of a high degree of purity, as is usual in the art of luminescent materials manufacture.

Some specific methods of preparing luminescent materials in accordance with the invention will now be described by way of example. In each of the following examples the stated color of fluorescence of the product is that produced under excitation by ultraviolet radiation of wavelength 2537 A.

Example 1

A mixture of 34.6 grams of zinc oxide (ZnO), 15.4 grams of lithium carbonate ($Li_2CO_3$), 60 grams of silica gel (85% $SiO_2$) and 4.2 grams of manganese carbonate ($MnCO_3$) is prepared by milling the components together, and the mixture is placed in a silica boat and heated in steam at 1000° C. for one hour. The product of this heating is ground thoroughly and is again heated in steam at 1000° C. for one hour.

The product exhibits a greenish-yellow fluorescence, the brightness of which may be increased by further firing in steam at 1000° C.

Example 2

A mixture of 34.6 grams of zinc oxide, 15.4 grams of lithium carbonate, 60 grams of silica gel (85% $SiO_2$) and 6 grams of manganese carbonate is prepared as described in Example 1 and is heated in steam at 1100° C. for five hours.

The product exhibits a yellow fluorescence.

Example 3

A mixture consisting of 34.6 grams of zinc oxide, 15.4 grams of lithium carbonate, 60 grams of silica gel (85% $SiO_2$) and 9.4 grams of manganese carbonate, prepared as described in Example 1, is heated in steam for five hours at 1000° C.; a luminescent material having an orange fluorescence is produced.

*Example 4*

A mixture consisting of 34.6 grams of zinc oxide, 15.4 grams of lithium carbonate, 120 grams of silica gel (85% $SiO_2$) and 6.1 grams of manganese carbonate, prepared as described in Example 1, is heated in steam at 1000° C. for four hours; the product of this heating shows a cream-yellow fluorescence.

What I claim as new and desire to secure by Letters Patent of the United States is:

1. A luminescent material consisting essentially of manganese-activated zinc-lithium silicate having a molecular ratio of zinc oxide to lithium oxide of about 2:1 and a molecular ratio of silica to lithium oxide between about 12:1 and 2:1, the manganese activator being approximately 2–5 per cent by weight of the material.

2. A luminescent material consisting essentially of manganese-activated zinc-lithium silicate having a composition represented by the formula $2ZnO.1Li_2O.4SiO_2$, the manganese activator being approximately 2–5 per cent by weight of the material.

ALFRED H. McKEAG.

REFERENCES CITED

The following references are of record in the file of this patent:

UNITED STATES PATENTS

| Number | Name | Date |
|---|---|---|
| 2,169,046 | Headrick | Aug. 8, 1939 |
| 2,205,815 | Foulke | June 25, 1940 |